(12) United States Patent
Goodridge et al.

(10) Patent No.: US 11,301,228 B2
(45) Date of Patent: Apr. 12, 2022

(54) MANAGING REMOVAL AND MODIFICATION OF INSTALLED PROGRAMS ON A COMPUTER DEVICE

(71) Applicant: Avecto Limited, Manchester (GB)

(72) Inventors: John Goodridge, Cheshire (GB); Richard De Mellow, Manchester (GB)

(73) Assignee: Avecto Limited, Manchester (GB)

( * ) Notice: Subject to any disclaimer, the term of this patent is extended or adjusted under 35 U.S.C. 154(b) by 215 days.

(21) Appl. No.: 16/200,892

(22) Filed: Nov. 27, 2018

(65) Prior Publication Data
US 2019/0163458 A1 May 30, 2019

(30) Foreign Application Priority Data
Nov. 30, 2017 (GB) .................................... 1719979

(51) Int. Cl.
*G06F 8/61* (2018.01)
*G06F 9/451* (2018.01)
(Continued)

(52) U.S. Cl.
CPC ................ *G06F 8/62* (2013.01); *G06F 9/453* (2018.02); *G06F 21/335* (2013.01); *G06F 21/57* (2013.01); *G06F 21/604* (2013.01); *G06F 21/629* (2013.01)

(58) Field of Classification Search
CPC . G06F 8/62; G06F 9/453; G06F 9/468; G06F 21/31; G06F 21/335; G06F 21/44; G06F 21/54; G06F 21/57; G06F 21/604; G06F 21/6209; G06F 21/6227; G06F 21/629; H04L 63/062; H04L 63/068;
(Continued)

(56) References Cited

U.S. PATENT DOCUMENTS 5,881,225 A 3/1999 Worth
5,991,542 A 11/1999 Han et al.
(Continued)

FOREIGN PATENT DOCUMENTS

EP 2750035 A1 7/2014
GB 2486528 B 9/2016
(Continued)

OTHER PUBLICATIONS

Chris Hoffman and Justin Pot; "How to Install Applications On a Mac: Everything You Need to Know" HowToGeek.com website [full url in ref.]; Jul. 20, 2017 (Year: 2017).
(Continued)

*Primary Examiner* — Wei Y Zhen
*Assistant Examiner* — Mohammed N Huda
(74) *Attorney, Agent, or Firm* — Morris, Manning & Martin, LLP; Daniel E. Sineway; Adam J. Thompson

(57) ABSTRACT

Removal or modification of an installed program on a computer device is requested by a calling process in a user account which itself may or may not have administrator privileges. An agent, cooperating with an operating system, intercepts a call to remove or modify the installed program made by the calling process prior to reaching an uninstaller component of the operating system. The agent determines whether or not to allow the remove or modify request and, if permitted, provides a proxy process through which the requested action to remove or modify the installed program is performed.

20 Claims, 7 Drawing Sheets

(51) Int. Cl.
   *G06F 21/57* (2013.01)
   *G06F 21/33* (2013.01)
   *G06F 21/62* (2013.01)
   *G06F 21/60* (2013.01)

(58) Field of Classification Search
   CPC ..... H04L 63/08; H04L 63/083; H04L 63/102; H04L 63/105
   USPC .......................................................... 717/174
   See application file for complete search history.

(56) References Cited

U.S. PATENT DOCUMENTS

| | | | |
|---|---|---|---|
| 6,233,618 | B1 | 5/2001 | Shannon |
| 7,133,904 | B1 | 11/2006 | Soyha et al. |
| 7,219,354 | B1 | 5/2007 | Huang et al. |
| 8,368,640 | B2 | 2/2013 | Dardinski et al. |
| 9,158,662 | B1 | 10/2015 | Hanes et al. |
| 9,769,131 | B1 | 9/2017 | Hartley |
| 10,803,499 | B1 | 10/2020 | Davis et al. |
| 2002/0144137 | A1 | 10/2002 | Harrah et al. |
| 2002/0174256 | A1 | 11/2002 | Bonilla et al. |
| 2004/0210771 | A1 | 10/2004 | Wood et al. |
| 2005/0188370 | A1 | 8/2005 | Kouznetsov et al. |
| 2006/0089834 | A1 | 4/2006 | Mowatt et al. |
| 2007/0180502 | A1 | 8/2007 | Yadav et al. |
| 2007/0198933 | A1* | 8/2007 | van der Bogert et al. ................... G06F 21/52 715/741 |
| 2008/0060051 | A1 | 3/2008 | Lim |
| 2008/0289026 | A1* | 11/2008 | Abzarian et al. ....... G05F 21/57 726/11 |
| 2009/0070442 | A1 | 3/2009 | Kacin et al. |
| 2010/0274366 | A1 | 10/2010 | Fata et al. |
| 2011/0030045 | A1 | 2/2011 | Beauregard et al. |
| 2011/0173251 | A1* | 7/2011 | Sandhu et al. ........ H04L 63/102 709/203 |
| 2011/0174251 | A1* | 7/2011 | Sandhu et al. ........ H04L 63/102 709/203 |
| 2011/0196842 | A1 | 8/2011 | Timashev et al. |
| 2011/0239288 | A1 | 9/2011 | Cross et al. |
| 2011/0251992 | A1 | 10/2011 | Bethlehem et al. |
| 2012/0047259 | A1 | 2/2012 | Krasser et al. |
| 2012/0054744 | A1 | 3/2012 | Singh et al. |
| 2012/0066512 | A1 | 3/2012 | Kass et al. |
| 2012/0198279 | A1* | 8/2012 | Schroeder ........... G06F 11/2294 714/32 |
| 2012/0226742 | A1 | 9/2012 | Mornchilov et al. |
| 2013/0057561 | A1 | 3/2013 | Nave et al. |
| 2013/0339313 | A1 | 12/2013 | Blaine et al. |
| 2014/0279600 | A1 | 9/2014 | Chait |
| 2014/0281528 | A1 | 9/2014 | Dubey et al. |
| 2015/0040181 | A1 | 2/2015 | Cook et al. |
| 2015/0058839 | A1 | 2/2015 | Madanapalli et al. |
| 2015/0074828 | A1 | 3/2015 | Beauregard et al. |
| 2015/0128250 | A1 | 5/2015 | Lee et al. |
| 2016/0203313 | A1* | 7/2016 | El-Moussa et al. .... G06F 21/57 726/23 |
| 2016/0217159 | A1 | 7/2016 | Dahan et al. |
| 2016/0378962 | A1 | 12/2016 | Austin |
| 2017/0011220 | A1 | 1/2017 | Efremov et al. |
| 2017/0048259 | A1 | 2/2017 | Dodge et al. |
| 2017/0054760 | A1 | 2/2017 | Barton et al. |
| 2017/0111368 | A1 | 4/2017 | Hibbert et al. |
| 2018/0024895 | A1 | 1/2018 | Kumarasamy et al. |
| 2018/0302409 | A1 | 10/2018 | Hope |
| 2019/0121631 | A1 | 4/2019 | Hua et al. |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A2 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Chris Hoffman; "How to Disable System Integrity Protection on a Mac (and Why You Shouldn't)"; HowToGeek.com website [full url in ref.]; Jul. 5, 2017 (Year 2017).
Examination Report dated Apr. 29, 2020 for United Kingdom Patent Application No. GB1715628.2.
Examination Report dated Jun. 14, 2019 for United Kingdom Patent Application No. GB1600738.7.
Combined Examination & Search Report dated Feb. 6, 2018 for United Kingdom Patent Application No. GB1714489.0.
Combined Examination & Search Report dated Aug. 1, 2018 for United Kingdom Patent Application No. GB1802241.8.
Combined Examination & Search Report dated Nov. 16, 2018 for United Kingdom Patent Application No. GB 1808380.8.
Combined Examination & Search Report dated Mar. 6, 2019 for United Kingdom Patent Application No. GB1814798.3.
Combined Examination & Search Report dated Dec. 1, 2017 for United Kingdom Patent Application No. GB 1708824.6.

* cited by examiner

MANAGING REMOVAL AND MODIFICATION OF INSTALLED PROGRAMS ON A COMPUTER DEVICE

CROSS REFERENCE TO RELATED APPLICATIONS

This application claims the benefit of and priority to Great Britain Application No. 1719979.5, filed Nov. 30, 2017, entitled "MANAGING REMOVAL AND MODIFICATION OF INSTALLED PROGRAMS ON A COMPUTER DEVICE," the disclosure of which is incorporated by reference as if set forth herein in its entirety.

BACKGROUND

Technical Field

The present invention relates generally to the field of computers and computer devices. More particularly, the present invention relates to a computer device and to a method of managing removal and modification of installed programs on a computer device.

Related Art

It is desirable to implement a least-privilege access security model, where each user is granted only a minimal set of access privileges by way of their standard user account. This model is particularly helpful for reducing the risk of attacks from malicious software (malware).

A difficulty arises in that a relatively high privilege level, such as an administrator level, is normally required in order to successfully remove or modify an installed program. Typically, another user having higher privileges (e.g. an IT support administrator) must be called upon in order to perform the intended removal or modification which the standard user is unable to perform by themselves.

Also, many users have difficulty in operating their computer device correctly and safely, or else require a high degree of training and support. Hence, wherever possible, it is desirable to maintain familiar existing user interfaces for managing the installed programs.

The example embodiments have been provided with a view to addressing at least some of the difficulties that are encountered in current computer systems, whether those difficulties have been specifically mentioned above or will otherwise be appreciated from the discussion herein.

SUMMARY

According to the present invention there is provided a computer-implemented method, a computer system and a computer-readable storage medium as set forth in the appended claims. Additional features will be appreciated from the dependent claims, and the description herein.

In one example, there is described a method of removing or modifying an installed program on a computer device. A calling process which is associated with a current user account on the computer device initiates a requested action to remove or modify the installed program. The requested action is intercepted prior to reaching an installer component of an operating system of the computer device. The requested action to uninstall or modify is evaluated by an agent on the computer device and, where permitted by the agent, a proxy is provided and the requested action to remove or modify the installed program is performed by or through the proxy.

In one example, there is described a computer device having a memory and a processor which are configured to perform any of the methods discussed herein.

In one example, a tangible non-transitory computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The following description reveals example embodiments of a mechanism for managing removal or modification of an installed program on a computer device. In at least some examples, the mechanism upholds security of the computer device while enabling an installed program to be removed or modified by users themselves with minimal additional support or supervision. Many other advantages and improvements will be appreciated from the discussion herein.

The example embodiments will be discussed in detail in relation to computer devices using Windows® operating systems provided by Microsoft Corporation of Redmond, Wash., USA, and with particular reference to the most recent Windows 10® operating system. However, the teachings, principles and techniques as discussed below are also applicable in other specific example embodiments. In particular, the described examples are useful in computer systems having a security model which employs discretionary access control.

Figure 1:
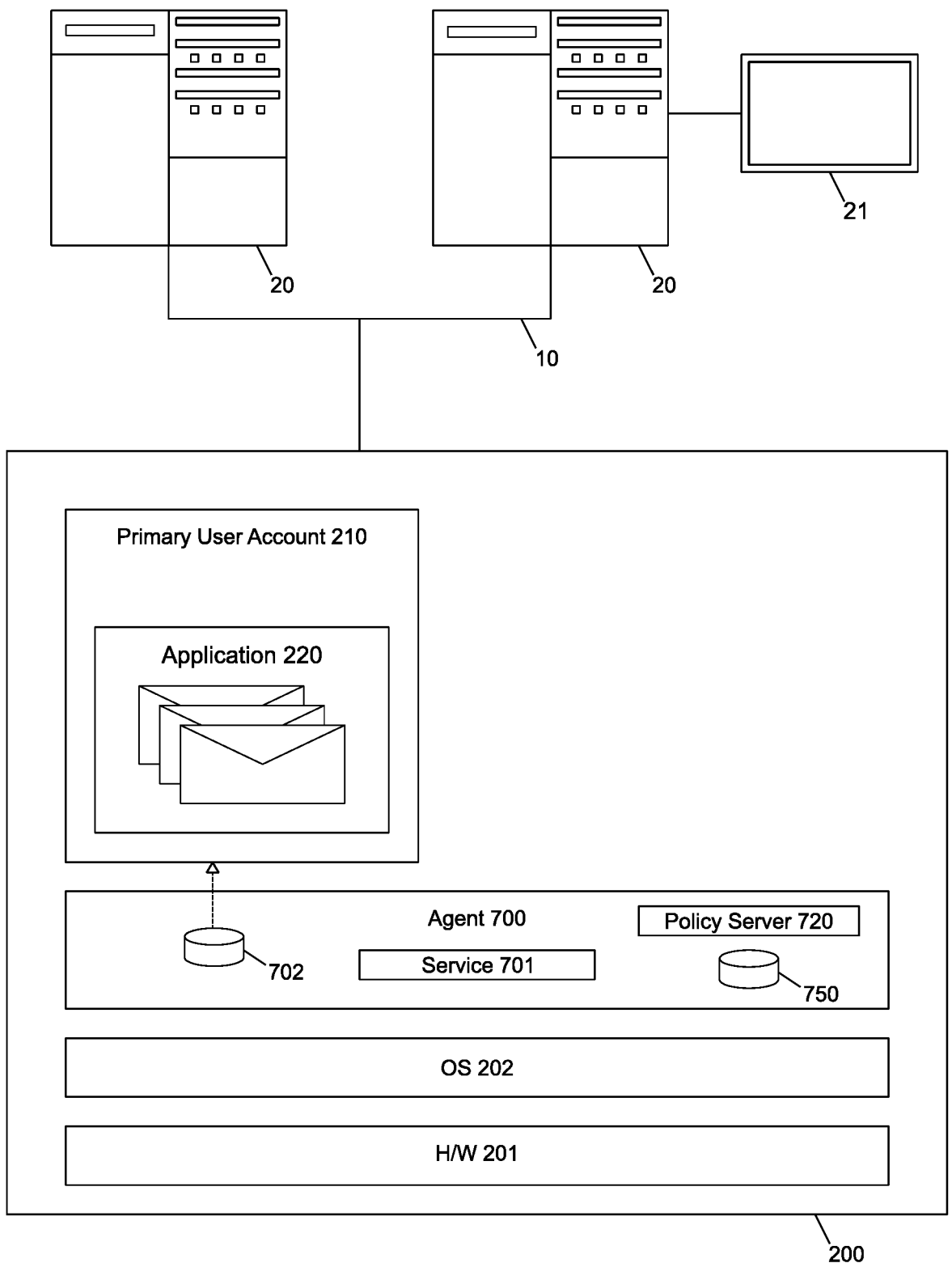
FIG. 1 is a schematic view of an example computer device and network.

FIG. 1 is a schematic overview of an example computer device and network. In this simplified example, an end-user computer device 200 is coupled by a network 10 to a set of servers 20. For example, the network 10 can be a private network, a virtual private network, an intranet, a cloud, or the Internet. In practice, computing environments for large-scale corporations will typically include many thousands of individual end-user computer devices 200 coupled to many tens or many hundreds of servers 20.

Each end-user computer device 200 may take any suitable form factor. As examples, the device 200 might be a desktop computer, a portable computing device, laptop, tablet, smartphone, wearable device, or an emulated virtual device on any appropriate host hardware. The illustrated computer device 200 comprises a layer of hardware (H/W) 201, which suitably includes memory, processors (CPU central processor units), I/O input/output interfaces (e.g. NIC network interface cards, USB universal serial bus interfaces, etc.), storage (e.g. solid state non-volatile storage or hard disk drive), and so on. An operating system 202 runs on the hardware layer 201 to provide a runtime environment for execution of user processes and applications 220. This runtime environment typically provides resources such as installed software, system services, drivers, and files. In this illustration, the applications 220 include an email client which is used to send and receive email messages. Of course, many other types of software application are available and can be provided according to the needs of the user of each particular device.

In this example, the operating system 202 applies a security model wherein access privileges are based on a user account 210. The operating system 202 may define privilege levels appropriate to different classes of users, or groups of users, and then apply the privileges of the relevant class or group to the particular logged-in user (e.g. ordinary user, super-user, local administrator, system administrator, and so on). The user is authenticated such as by logging-in to the computer device 200, e.g. with a user identity and password, and these user credentials may be validated locally or via a remote service such as a domain controller. The current user, via their previously prepared security account, thus acts as a security principal in the security model. The operating system 202 of the computer device 200 then grants appropriate privileges to the processes and applications 220 which execute in the security context of that primary user account 210.

In this example, the computer device 200 further comprises an agent 700. The agent 700 may comprise one or more software and/or hardware modules, such as executables, dynamic libraries, plug-ins, add-ins, add-ons or extensions. In the context of Windows operating systems, the agent 700 may comprise a Windows service 701 which acts as a core module or kernel component. In a macOS environment, the agent 700 may comprise a daemon, which runs as a background process on the computer device. The agent 700 may further comprise one or more injected libraries 702 (i.e. a dynamic linked library DLL) which may be injected by a driver into the context of the user account 210. Thus, the agent 700 is configured to operate in close cooperation with the operating system 202 and with the client applications 220.

In this example, the agent 700 supports core capabilities for security of the computer device. In particular, the agent 700 suitably implements at least a privilege management function and an application control function. The agent 700 thus acts as a secure gatekeeper to control activity on the computer device 200 in addition to, and in cooperation with, the existing security mechanisms of the operating system 202.

When considering privilege management, it is desirable to implement a least-privilege access security model, whereby each user is granted only a minimal set of access privileges. Many application programs however require a relatively high privilege level, such as a local administrator level, in order to be modified or removed. Hence, in practice, there is a widespread tendency to grant additional privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device, e.g. by accidently uninstalling a critical process or program, leading to errors or corruption within the computer device. Further, an infection or malware may access the computer device with the deliberate intention of subverting security or causing damage, such as by modifying a normal and otherwise harmless application, e.g. to hide a key log to obtain credit card numbers or bank details.

In one example, the primary user account 210 has a relatively low privilege level. The agent 700 then selectively enables access to higher privilege levels, e.g. a local administrator level, when needed to perform certain tasks. Thus the agent 700 provides the privilege level to perform a specific task, but does not provide a general high level privilege to the user account. Conversely, the agent 700 in some examples is also able to downgrade the privilege level, so that certain tasks are carried out at a privilege level lower than that of the current user account 210.

For application control, the agent 700 is arranged to ensure that only authorised applications 220 may be installed on the computer device 200. For example, the agent 700 may comprise a list of approved and/or restricted applications. There may be a sophisticated set of rules which define the conditions under which each application may be installed, modified, or removed, in relation to the intended host computer device 200 and the relevant user account 210. Thus, in this example, the email client application 220 on the computer device 200 will only be removed or modified (e.g. updated to a more recent version) if permitted by the rules as implemented by the agent 700.

In one example, the agent 700 is coupled to a policy file 750. The policy file 750 stores a set of policies which define responses of the agent 700 to requested actions or tasks. A policy server 720 may be provided to make policy decisions based on the policy file 750. Suitably, the policy server 720 is provided as a service locally on the computer device 200 which links to other components of the agent 700. That is, the policy server 720 may reside as a component within the agent 700, or may be implemented as a separate service that is communicably linked to the agent 700. The policy server 720 may operate by receiving a policy request message, concerning a requested action and related meta-information, and returning a policy result based thereon. In one example, the agent 700 is configured to capture a set of identities, and may then provide these identities as part of the policy request. Such identities may include, for example, a user identity (UID) of the relevant user account 210, a group identity (GID) of a group to which that user account 210 belongs, a process identity (PID) of a current process which has initiated the action or task in question, and/or a process identity of any parent process (PPID). Suitably, the policy server 720 determines an outcome for the request based on the provided set of identities relevant to the current policy request.

In one example, the policy file 750 is a structured file, such as an extensible mark-up language XML file. The policy file 750 is suitably held locally on the host device 200, ideally in a secure system location which is accessible to the agent 700 and/or the policy server 720 as appropriate, but which is not accessible by the user account 210. Updates to the policy file 750 may be generated elsewhere on the network 10, such as by using a management console 21 on one of the servers 20, and then pushed, or pulled, to each instance of the agent 700 on each device 200. The policy file 750 is readily updated and maintained, ensuring consistency for all devices across the network. In this way, the agent 700 is robust and manageable for a large-scale organisation with many thousands of individual computer devices 200. Also, the agent 700 is able to leverage rules which have been developed in relation to application control, such as defining user groups or user roles and related application permissions, and now extend those same rules also to privilege management, and vice versa.

In some examples, the agent 700 is configured to perform custom messaging. In particular, agent 700, whether acting directly or via a cooperating proxy or plugin, may present a message dialog to the user. This message dialog may be presented in a terminal from which a current action of interest was invoked by or on behalf of the user. Thus, the custom messaging may be presented on a display of the computer device 200 for interaction with the user. Input from the user may be returned to the agent 700 for evaluation. Hence, the agent 700 is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file 750, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication to be presented by the user in order to proceed with the requested action. As an example, the additional authentication may require the user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as a two-factor authentication. In one example, the challenge-response requires entry of a validation code, which might be provided such as from a second device or an IT helpdesk.

In one example, the reason allows the user to provide feedback concerning the motivation for their request, e.g. by selecting amongst menu choices or entering free text. Logging the reasons from a large set of users allows the system to be administered more efficiently in future, such as by setting additional rules in the policy file 750 to meet the evolving needs of a large user population.

Notably, custom messaging allows the agent 700 to provide a rich and informative set of interactions with the users. Each of these individual custom messaging actions may be defined in the policy file 750. The custom messaging may eventually result in a decision to allow or block the requested action. An appropriate allow or block operation is then carried out as required.

In this example, the agent 700 may further perform auditing in relation at least certain requests. The auditing may include recording the customised messaging, if any, and may include recording an outcome of the request. Audit reports may be extracted or uploaded from each end-user device 200 such as to the management console 21 on the servers 20 at any suitable time or frequency or based on any suitable event. Each of these auditing functions may be defined in the policy 750.

In some examples, the agent 700 is configured to perform passive handing of a request. In this case, the request is presented to the originally intended recipient, typically within the operating system 202, and any responses may be returned transparently. In one example, passive handling is defined by the policy file 750. The agent 700 can meanwhile audit the requests which were handled passively, again consistent with the policy file 750. Notably, this passive handling function allows the action to proceed while the requesting user process or application is unaware of the agent 700 as intermediary. Advantageously, default behaviour of system is maintained for those actions that the agent 700 determines should have passive handling. Also, there is now a fail-safe option, in that the system will maintain an expected behaviour for actions that are passively handled. This passive handling is useful particularly in the event that a particular user or request is not specified in the policy file 750, because default behaviour is still enacted. Hence, the system can now quickly and safely supersede the original behaviour for specific situations, allowing rapid responses and network-wide consistency when needed, while still enabling existing legacy functionality and behaviour to continue in place for other actions, users and/or devices, as appropriate.

Remove or Modify Installed Programs

Figure 2:
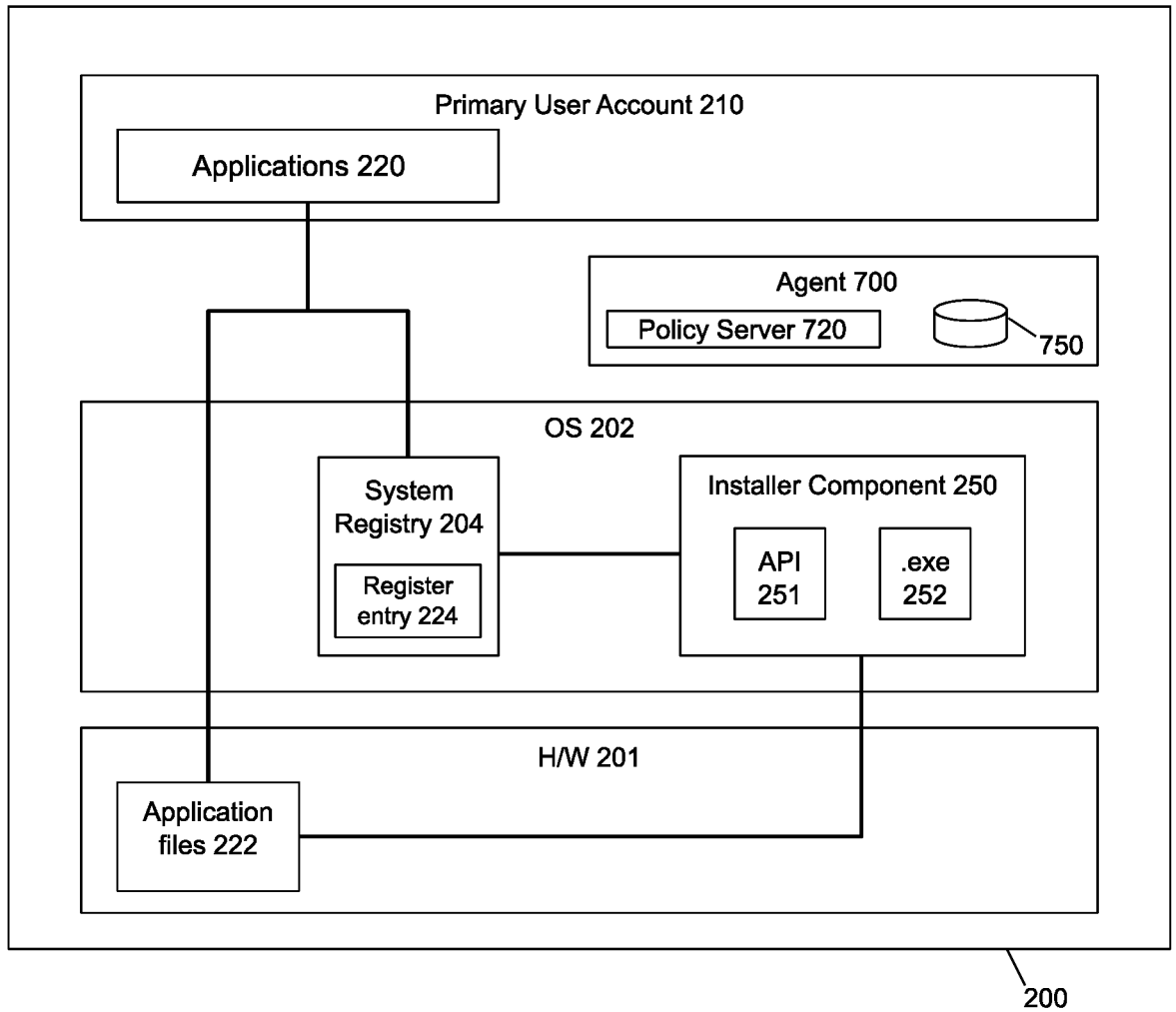
FIG. 2 is a schematic view of the example computer device in more detail.

FIG. 2 shows the example computer device 200 in more detail, wherein a set of programs 220 have been installed previously. Typically, the operating system 202 includes an installer component 250 (e.g. Windows Installer) which supports installation of a new program onto the computer device 200. Typically, the same installer component 250 of the operating system 202 also supports both removal (also termed 'uninstallation') and modification (also termed 'change' or 'repair') of an installed program. Hence, those skilled in the art will recognise the term 'installer component' in this context. However, that functionality could be provided as a distinct and separate removal component or modification component of the operating system 202 in other example embodiments.

As shown in FIG. 2, each installed program 220 typically comprises a set of files 222 including executable code and other data relevant to execution of the program. The program files are installed to various locations (i.e. folders) on the system by the installer component 250. The installer component 250 also creates an entry 224 for each installed program 220 in the Registry 204 as managed by the operating system 202. For example, when a program is installed, one or more new sub-keys are added to the Registry 204 containing settings including the location, version, and how to start the program. Thus, each installed program 220 is associated with a diverse set of resources 222, 224 in multiple locations on the computer device 200. A difficulty arises in accurately managing this set of resources 222, 224 for each application 200 in order to correctly perform an appropriate removal or modification.

Figure 3:
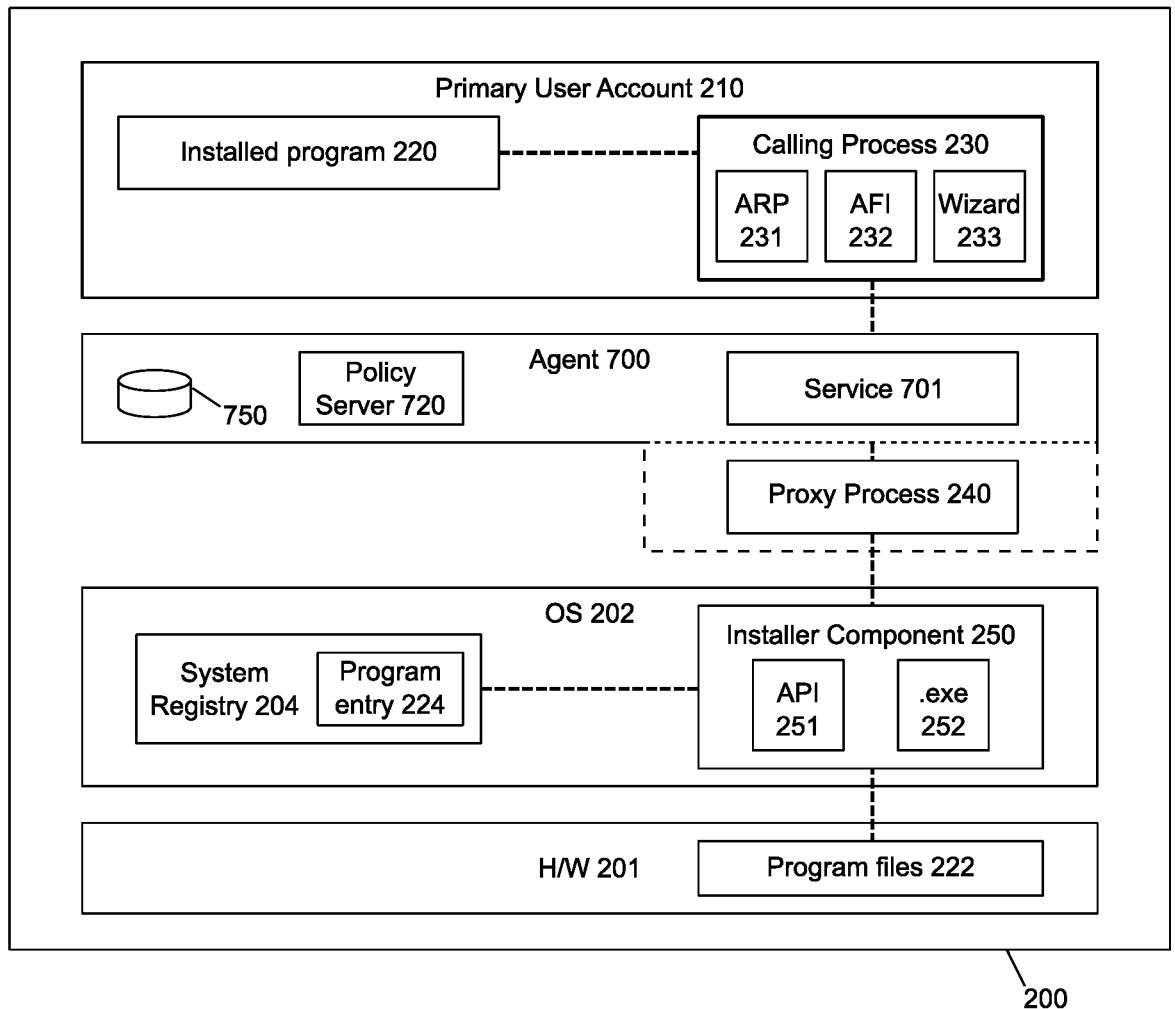
FIG. 3 is a schematic view of the example computer device in more detail.

FIG. 3 is a schematic diagram of the example computer system 200 in more detail. In this example, a calling process 230 will initiate a requested action to remove or modify a particular program 220, where the calling process 230 is suitably any process which is able to call the installer component 250 of the operating system 202. In practical examples, removing or modifying an installed program can be initiated in several ways. In one example, a user can initiate an uninstall or repair action from an appropriate user interface component of the operating system 202, particularly a control panel interface, such as the Windows Add or Remove Programs 'ARP' applet 231. Another example is an applications and features interface component, such as the 'Apps & Features' interface ('AFI') 232 in Windows 10. In a further example, one or more third-party installer (TPI) programs 252 may be provided. Usually, such third party installers 252 are themselves executable programs. These installers 252 may be accessed via the control panel interface, e.g. the ARP 231 or AFI 232, or initiated directly as for any other program, e.g. from a Start menu, from a folder location or from a command line. Often, initiating such a third party installer 252 will launch a set-up assistant user interface (or 'Wizard') 233 to remove or modify a particular program. These various options will now be explored in more detail below.

In a first example, a user who wishes to remove or modify a particular installed program may open the ARP interface 231 via the control panel and select the relevant program 220 from amongst those listed. The ARP interface 231 suitably builds, and causes to be displayed, a program list of the installed programs on this computer device 200. Suitably, the program list is collated according to the installed programs as identified in the Registry 204. In this example, a user interaction, typically a right-mouse context menu, or equivalent, e.g. on a touch-screen input device, provides a request to initiate a remove or modify action. Notably, the ARP interface 231 is familiar to many ordinary users and it is desirable to maintain user interactions through that interface.

In the example of FIG. 3, the remove or modify request is intercepted by the agent 700. Conveniently, intercepting the request is achieved by placing a hook on the call to the installer component 250. The agent 700 thereby interrupts the normal operation of the system.

Once the agent 700 has intercepted the request, information related to the user account 210 and the requested remove or modify action are transferred to the agent 700. Suitably, the hook is provided in the context of the calling process 230, while the service 701 of the agent 700 executes in a separate (privileged) context. Suitably, this metadata information is then evaluated against the rules maintained by the agent 700, conveniently in the policy file 750 as evaluated by the policy server 720.

In general, evaluating the rules by the agent 700 produces one of a predetermined set of outcomes. In one instance, permission should be given to execute the requested action for removal or modification of the program 220. In another instance, the requested action should be blocked. In a third instance, a specific rule does not exist, or the rules check returns an indication to operate in the passive-handling mode as already explained above.

In this example, upon determining to permit the requested action, the agent 700 establishes a proxy, here illustrated by the proxy process 240. In general, the proxy process 240 is provided with appropriate privileges to perform the requested action. In this example, the user account 210 as a standard user is itself unable to uninstall the program 220, and therefore the proxy process 240 is provided with elevated permissions (e.g. local administrator) as determined by the agent 700.

Conveniently, the agent 700 transfers relevant metadata information for the requested action to the elevated proxy process 240. The elevated proxy process 240 then calls the remove or modify methods of the installer component 250 on behalf of the calling process 230.

In this example, a removal action causes the set of files 222 related to the program 220 of interest to be deleted from the system 200, along with removal of relevant register entries 224 from the Registry 204. Likewise, the modification action causes one or more of the set of program files 222 to be updated and/or causes a change to the registry entry 224 of the program 220. Suitably, an outcome status of the remove or modify operation (e.g. successful completion) is then passed back to the calling process 230.

Where the agent 700 determines to deny permission to execute the requested action, then the requested action is terminated. The agent 700 may return a message dialog to the user account 210. In one example a user may have requested an update to a particular program but be denied permission to do so. The agent 700 may display a message dialog to indicate that the user does not have the relevant permissions.

In another example, malicious software may attempt to modify the installed program 220. Such an attempt is identified by the agent 700, e.g. by considering the process identity (PID) of the calling process 230. The agent 700 may block the malicious software and may take appropriate escalation action, such as providing a message dialog to alert the user to the malicious software, performing auditing, and/or notifying a supervisor of the system via the management console 21.

Where the agent 700 operates in the passive mode, the agent 700 does not interfere any further in the requested action. The original call, made by the calling process 230 to the installer component 250, is allowed to proceed to the called installer component 250. That is to say, the operating system 202 now handles the requested action in its usual way. As noted above, the agent 700 in this mode still has the opportunity to perform custom messaging, and also has the opportunity to audit the requested action.

Figure 4:
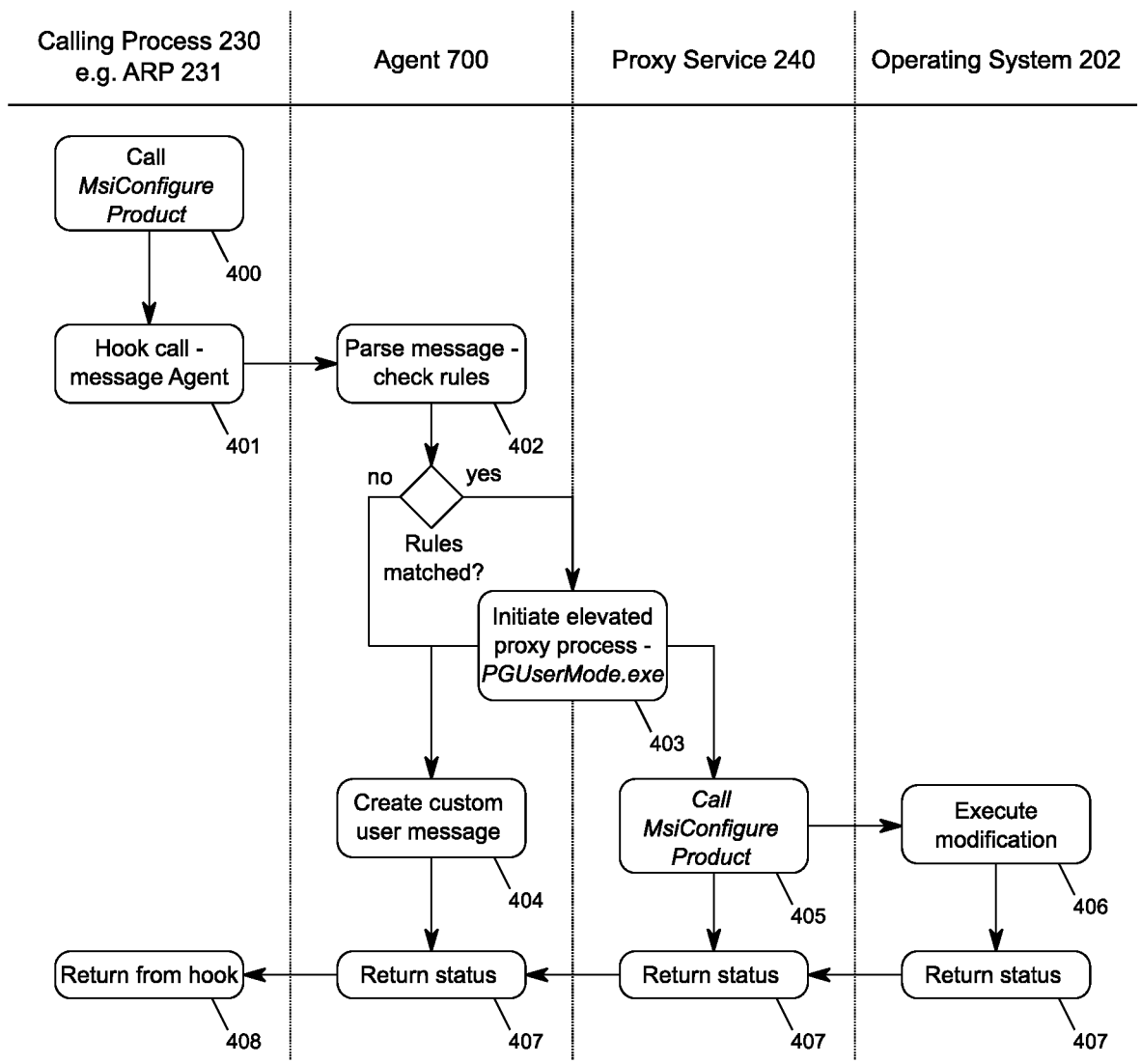
FIG. 4 is a flowchart showing an example method as applied to the example computer device.

FIG. 4 shows an example method of modifying a program consistent with the above discussion. For illustration, a user may require an additional language pack (e.g. support for Korean characters) to be added to an already installed program 220 such as a text editor (e.g. Word), and it is desirable that the user is able to perform that modification without involving IT support. In this example, the calling process 230 is the Windows Add or Remove Programs 'ARP' interface 231 and the installer component 250 is the Microsoft Windows Installer 'MSI' 251.

In this example, the MSI installer component 251 comprises application programming interface 'API' functions which perform the modification or removal of a program. The relevant API functions work in conjunction with one of three types of files: Microsoft Windows Installer 'MSI' files; Microsoft Windows Patch 'MSP' files; and Microsoft Windows Transformation 'MST' files.

Each MSI file is a database file for the MSI installer component 251. For a particular program 220, the corresponding MSI file contains data on how to install, modify or uninstall the program and information about the program 220. Examples of such information include: publisher information; signing information of the file; package code; upgrade code; and product code.

A Windows Installer patch 'MSP' file is a self-contained package that contains updates to a program 220 and describes which versions of the program can receive the updates. A patch can contain an entire file or only certain file segments to update part of the file. This is in contrast to an updated MSI which installs—or reinstalls—the entire program.

An MST file is used to transform an MSI database into a new state and relies upon the relevant MSI. These MST files may be used to change the settings of the MSI installer; e.g. allowing custom user groups or non-default installation augments. MST files are commonly used in software testing and development as they make it easier to change how an MSI should install without having to recreate the entire MSI.

At step 400 of FIG. 4, the calling process 230 in the user account 210 initiates a request to modify (e.g. update) a program 220 through, in this case, the ARP interface 231. The request initiates a call to the installer component 250, which in this example is a call to the relevant API function within the native Windows Installer 251 of the operating system 202.

At step 401, the agent 700 intercepts the call, suitably by placing a hook on the relevant modification or removal functions. The API functions which are currently known to be relevant to removing or modifying a program are: MsiConfigureProduct; MsiReinstallProduct; MsiConfigureProductEx; and MsiRemovePatches. These functions may be called by any calling process 230 which is initiating modification or removal of a Windows Installed program, and are not restricted to being called only from the ARP interface 231.

MsiConfigureProduct handles both uninstall (remove) and change (modify) actions for a program.

MsiReinstallProduct is used to repair a currently installed program. This function is also called where a program initiates an automatic repair, for example when Microsoft Office detects a missing module.

MsiConfigureProductEx is an extended version of MsiConfigureProduct which allows for changes to be made to an installed state of a program in a more granular way: for example, removing a patch from an installed program.

MsiRemovePatches provides functionality for removing multiple patches from a product simultaneously but otherwise works in the same way as MsiConfigureProduct.

In this example, a modify action has been requested, therefore at step 401 the agent 700 intercepts the call from the ARP interface 231 to the MsiConfigureProduct function.

The intercepted request is transferred to the agent 700. The normal call to the function MsiConfigureProduct is prevented from executing and information which would have been used to call that API function is instead transferred to the agent 700. Additionally, information on the current UI state of the computer device is transferred to the agent 700. The current UI information is useful when calling the API functions in order to maintain a consistent display state in the user interface, particularly to select amongst a set of UI levels offered by the operating system 202 (e.g. Full UI, Reduced UI, Basic UI, None). The current state UI state may be obtained through use of the function MsiSetInternalUI.

In this example, a product code GUID of the program 220 is also included in the information transferred to the agent 700. The product code GUID identifies the installed program 220 and is unique to a specific version of the program. The product code GUID may be used to extract information from a Windows Installer file (e.g. MSI) and is used when calling the API functions of the native Windows Installer component 251. Windows Installer files typically include a product (program) name, product publisher, and product version. Optionally the product code property, which is unique to a specific version of the product, may be included but is not necessarily present in all Windows Installer files.

At step 402, the request is checked against the rules maintained by the agent 700, i.e. in the policy file 750. The rules may be based on, for example, the product code GUID of the program 220, the action being requested (modify in this example), and other information related to the program 220 (e.g. name, publisher, version) as gained directly from the relevant Windows Installer file.

At step 403, where the agent 700 determines that the requested modification of the program 220 should be permitted, the agent 700 provides a proxy process 240. In this example the proxy process 240 is a proxy for PGUserMode.exe. In one example the proxy process 240 is performed within the service 701 of the agent 700. In another example, the proxy process 240 is launched as a separate new process having the privileges required to perform the requested action. In this example, the proxy process 240 is created by the service 701 and may inherit elevated privileges of the service 701 such that the operating system 202 may perform the modify operation. Suitably, the agent 700 will transfer to the proxy process 240 the information to call the MsiConfigureProduct API function.

Optionally, at step 404, the agent 700 may present a custom message dialog to the user, as already explained above. For example, the user may be informed that their modify request has been permitted, or be informed as to the progress of the requested action.

At step 405, the elevated proxy process 240 calls the MsiConfigureProduct API function, or more generally the Windows Installer API functions 251, on behalf of the ARP interface 231. In this example the proxy process 240 has been launched with the elevated privileges required to perform the modify process. Thus, at step 406, the operating system 202 will now modify (e.g. update) the installed program 220 without requiring administrator level privileges in the user account 210 of the current logged-in user.

At step 407, a reply message is generated based on the success status of the modify process. At step 408, the reply message is returned to the ARP interface 231 such that the ARP interface 231 may continue any processes which are waiting on the status return.

Non-MSI/Third Party Installers

Figure 5:
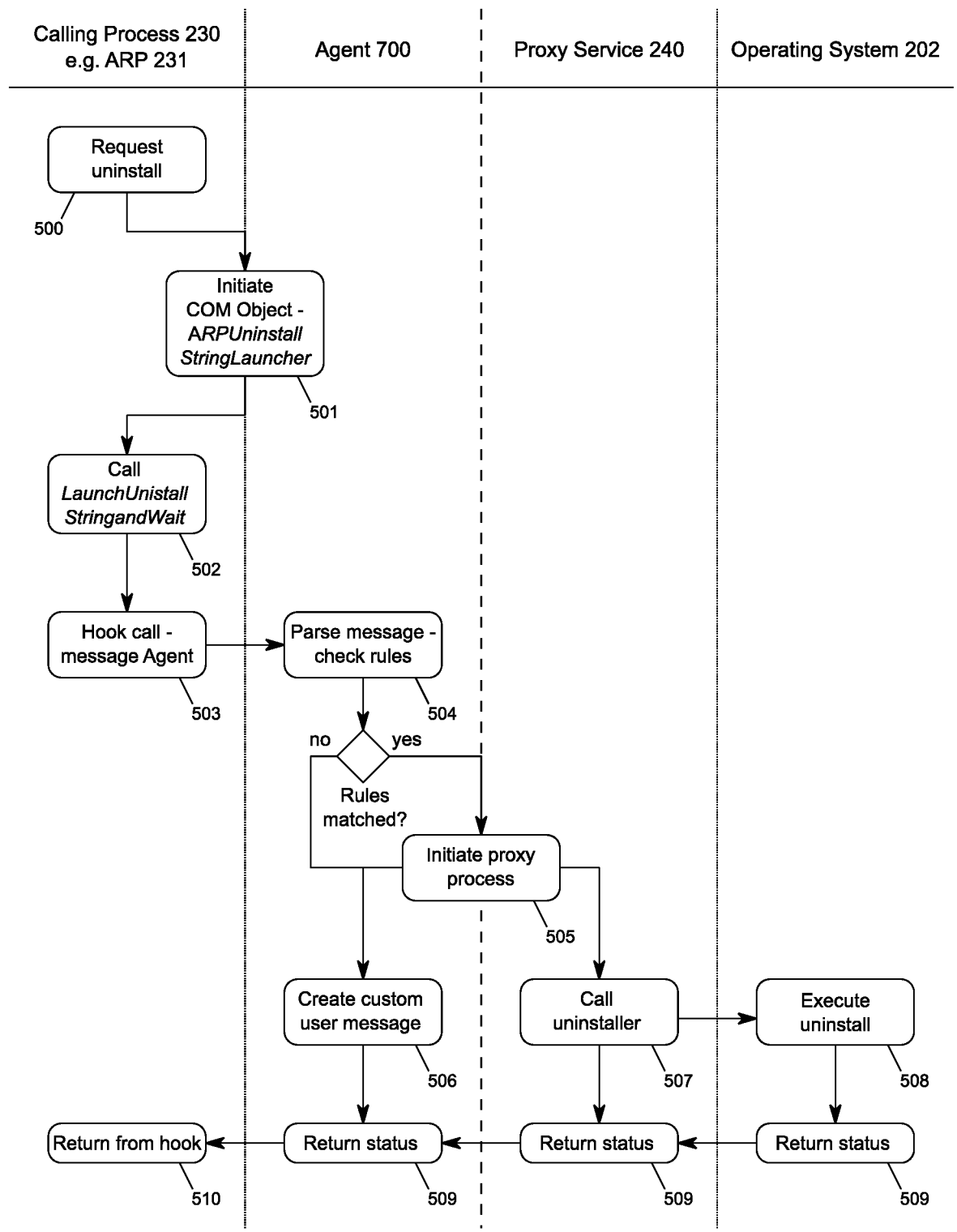
FIG. 5 is a flowchart showing an example method as applied to the example computer device.

FIG. 5 shows an example of uninstalling a third party installed program; that is to say a program which has not been installed by the native Microsoft Windows Installer 251. Accordingly, in this example, the installer component 250 is a third party installer 252.

As mentioned above, third party installers 252 are often self-extracting archive files, i.e. executable programs which contain compressed data in an archive file combined with machine-executable program instructions to extract the archived information. Typically, the third party installer 252 contains all the files that need to be installed, but in some instances may download additional files from the Internet. These installers 252 may set-up values in the system Registry 204 which specify information about the publisher, install location, program version, whether the program can be modified (ModifyPath), and the uninstall path (UninstallString) in an Uninstall key. However, in contrast to Windows Installed programs, there are no restrictions placed on these values. Rather, set-up and maintenance of these Registry values is the relevant Registry entry 224 is left entirely in the control of the installer 252 itself. Hence, it is more difficult to manage these non-MSI programs.

Typically, the same third party installer 252 will also handle removal and modification of the respective program 220, though in some examples a separate executable uninstaller may be provided. As a further consideration, general purpose uninstaller utility programs are also available, such as those available under the trade mark 'REVO' from VS Revo Group Ltd of Ruse, Bulgaria (see www.revouninstaller.com) or 'CCleaner' from Piriform Ltd of London, UK (see www.piriform.com). Normally, the third party installer 252 will call the relevant API functions directly, or run MSIexec.exe to provide access from the command line based on a product code GUID. It is desirable to protect against and control all of these various forms of third party installers 252, particularly in relation to their remove or modify actions.

In this example, for each installed program 220 on a Windows system there will be an associated entry under an Uninstall key in the system Registry 204. Certain programs will define a Windows Installer value under this key. If the key value has a particular first value, i.e. is '1', then the API functions of the native Windows Installer 251 may be called directly as described in the example process above. By contrast, if the Registry key value has a second value, i.e. is '0', or non-existent (i.e. undefined), then the program has been previously installed without using the Windows Installer 251. Rather, the program 220 has been previously installed using a bespoke third party installer 252. Such a third party installed program may be referred to as a 'non-MSI' or 'legacy' program.

At step 500, a request to uninstall a third party installed (non-MSI) program 220 is initiated through the calling process 230. In this example, the request initiates a call to the relevant installer component 250 to perform the uninstall. Notably, for a non-MSI program, a remove or modify request which is initiated through the ARP interface 231 launches a Component Object Model 'COM' interface. In normal operation, the operating system 202 will attempt to launch this COM object with elevated privileges. Launching the COM object may therefore trigger a user account control 'UAC' prompt, i.e. if the user account 210 does not have sufficient privilege.

Step 501 suitably comprises modifying creation of the COM object. This step may be handled by the injected library 702, or by the main service 701 of the agent 700. In this example, the COM object is instantiated without elevated privileges. Given that the COM object in this example does not require elevated privileges, the UAC prompt will not be triggered. Further, instantiating the COM object without elevated privileges prevents an unauthorised malicious process from being launched through the COM interface.

At step 502, the COM interface uses the Windows command line to call an appropriate method, in this case LaunchUninstallStringAndWait. The LaunchUninstallStringAndWait function comprises parameters which are used when calling the third party installer 252. These parameters include information on the requested action (uninstall in this example), the product code/name, and the current UI handle (the ARP 231 in this example). Further, in this example, this COM object does not take any further action, again blocking a potential vector of attack by malicious software.

At step 503, the agent 700 intercepts the requested action through a hook placed on the call to the LaunchUninstallStringAndWait function and transfers the hooked function to the agent 700. Here, the agent 700 is configured to intercept the call to the installer component 250 by hooking those operating system functions which return configuration settings from the Registry 204 relevant to the installed program 220. In this example, the LaunchUninstallStringAndWait function returns a set of parameters including a parameter strProduct which contains the product code or product name under the Uninstall registry key. Also, the parameter dwAction identifies the requested action (e.g. value '0' for uninstall, '1' for change/modify). Further, the parameter nWnd is the Windows handle of the current calling process 230 (e.g. ARP 231).

At step 504, information relevant to the requested action is evaluated by the agent 700, i.e., against the rules in the policy file 750. In this example, the evaluated information may be the product code, product name and uninstall parameters acquired from LaunchUninstallStringAndWait. The Product Code GUID cannot be used for third party installers as this relates only to Windows Installers. Other information which the rules may be based upon includes the display name, publisher, or display version of the application. This optional information is acquired through means other than the LaunchUninstallStringAndWait function.

Provided that permission is granted by the agent 700, the agent 700 provides an elevated proxy process 240 at step 505. In one example, the proxy process 240 is launched as a new process. Where the parent of this new process is the service 701 of the agent 700 the new process may inherit elevated privileges. In another example the proxy process 240 is provided within the service 701 itself. Thus, the proxy process 240 obtains the relevant privileges to perform the requested remove or modify action. In this example, the proxy process 240 is provided with elevated privileges which are required by the operating system 202 to perform the uninstall. Optionally, at step 506, the agent 700 may provide a custom message dialog to the user. For example, the user may be informed that their uninstall request has been permitted.

At step 507 the proxy process 240 calls the third party installer on behalf of the calling process 230. That is to say, the third party installer 252 is executed within the security context of the proxy process 240. Conveniently, the proxy process 240 performs the command line function CreateProcess. As the proxy process 240 has been given elevated privileges, at step 508 the operating system 202 may proceed to uninstall the program 220 without requiring administrator level privileges in the user account 210 of the current logged-in user. In particular, normal behaviour of the operating system 202 is modified, such as avoiding the need to present a user account control 'UAC' dialog requiring confirmation and/or presentation of additional credentials.

At step 509 a reply message is generated based on the success status of the uninstall process. The message is returned to the ARP interface 231 at step 510 such that the ARP interface 231 may continue any processes which were waiting on the status return.

Figure 6:
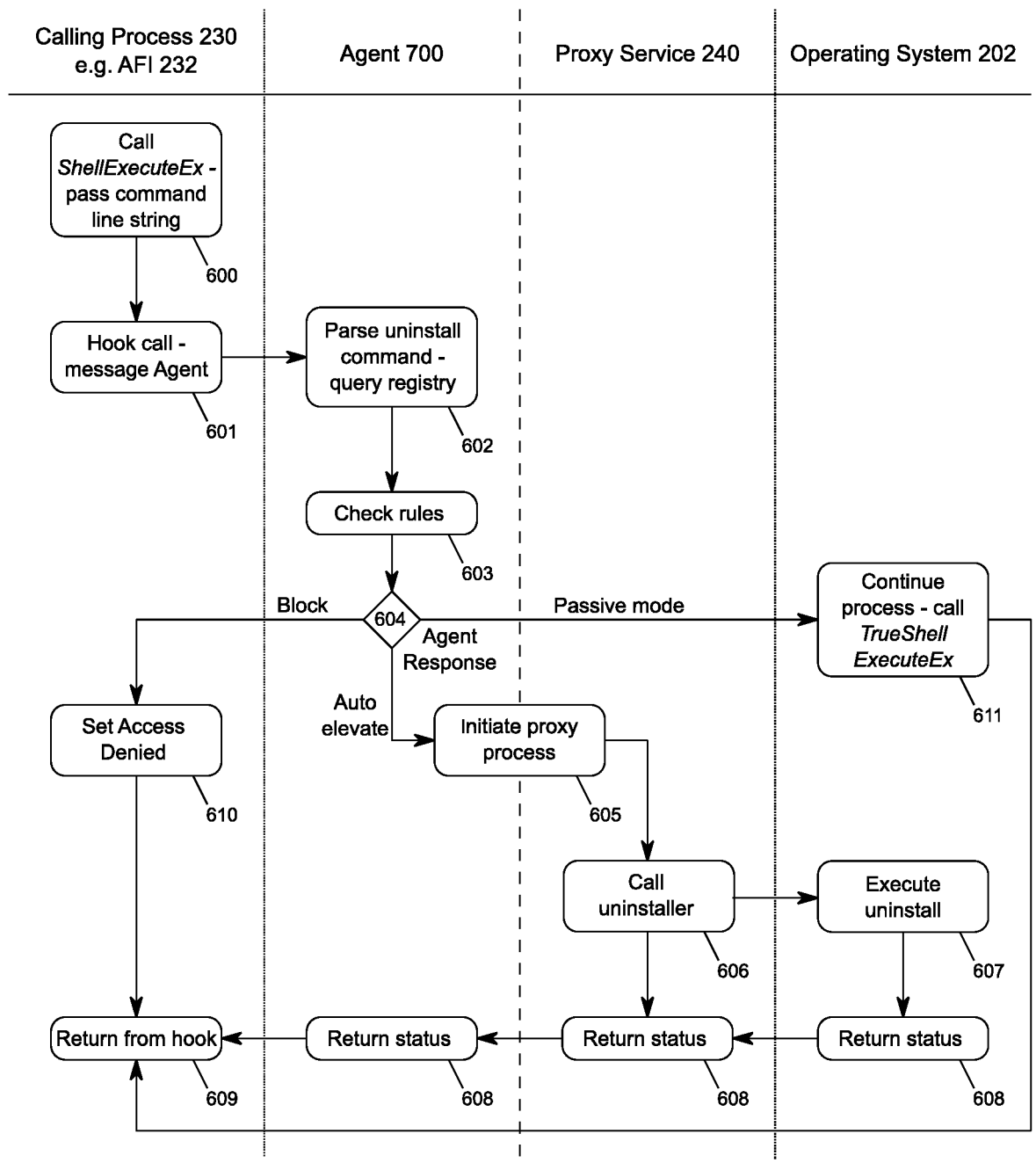
FIG. 6 is a flowchart showing an example method as applied to the example computer device.

FIG. 6 shows another example of uninstalling a program consistent with the above discussion. In this example, the calling process 230 is the Windows 10 Apps and Features interface 'AFI' 232. Windows 10 is part of the Universal Windows Platform 'UWP' which provides a common program platform on every device running Windows 10, including a PC, a mobile phone, or a gaming console, e.g. an Xbox®.

For programs which have been installed using the Windows Installer 251, the procedure is much the same as that shown by FIG. 4. The same API functions are called from the AFI 232 as from the ARP interface 231. Thus the same methods can be hooked and the same processes followed as described above. Intercepting a call to a third party installer 252 however requires a slightly different process as will now be illustrated in FIG. 6.

At step 600, the user account 210 initiates a request to uninstall a program through the AFI 232. Similar to the ARP interface 231, the AFI interface 232 allows a user to modify or remove programs on the system. In response to the user request, the system caches data from the Registry 204 for the identified installed program 220 and calls a function, here ShellExecuteEx, to execute the third party installer component 252.

ShellExecuteEx is a generic function which performs an operation on a specified file. In this example the operation is to 'execute' the third party installer 252. The operation is achieved by passing an appropriate command line string to the ShellExecuteEx function, i.e. through the SHELLEX-ECUTEINFO structure. As such the example of FIG. 6 may apply wherever this function is called and not just to the AFI 232. For example the ShellExecuteEx function may be called when a third party installer 252 is executed directly by a user, without using the AFI 232.

At step 601, the agent 700 intercepts the requested action by hooking the ShellExecuteEx function. In this example, the command line as passed to ShellExecuteEx is transferred to the agent 700. Notably, this data is provided as an arbitrary string, and hence there is a difficulty in accurately determining the content of that string.

At step 602, the agent 700 parses the command line string to extract its contents. In this example, the command line string passed to the agent 700 corresponds to the UninstallString under the program entry 224 in the system Registry 202. For example, if the relevant program was 7-Zip, the command line string may be 'C:\Program Files\7-Zip\uninstall.exe' (provided 7-Zip was installed using its default settings).

The command line string used to remove or modify a particular program is unique to that program. Therefore, by comparing the command line string against uninstall key values in the system registry 204, the agent 700 may identify the relevant Register entry 224 in the system Registry 204. Once the relevant entry 224 has been identified further information, e.g. product name and publisher information, may be extracted from the registry.

At step 603, the agent 700 checks the requested action against the rules in the policy file 750 as discussed above. The rules may be based on information extracted from the entry 224 in the system Registry 204. In this example, the product (program) name may be used as part of the rules check. The rules check may result in one of three actions, as shown by step 604. In this example, the agent 700 may determine to permit the requested action, block the requested action, or initiate passive mode operation.

Where the agent 700 determines that permission should be granted, at step 605 the agent 700 provides or launches an elevated proxy process 240 which calls the installer component 250 on behalf of the calling process 230. At step 606, the proxy process 240 calls the third party installer 252 using the relevant command line string. Again, the elevated proxy process 240 suitably performs the command line function CreateProcess. Since the proxy process 240 has been provided with the elevated privileges, at step 607 the operating system 202 may uninstall the program 220 without requiring administrator level user account details.

At step 608, a status or 'exit code' is generated based on the success status of the requested remove or modify action. At step 609, the status is returned to the calling process 230, here the AFI interface 232, to allow continuation of any processes which were waiting on the status return.

Returning to step 604, where the agent 700 instead determines that the requested action should blocked, the calling process 230 in the user account 210 is prevented from completing the requested action. In this example the user is denied permission to uninstall the desired program 220. At step 610 the agent sets an 'access denied' status and may provide a message dialog to the user account 210. Again, as at step 609, the 'access denied' status is returned to the calling process 230.

Where, at step 604, the agent 700 determines to operate in the passive mode, the agent 700 does not interfere any further in the requested action. At step 611 the original call made to the installer component 250 is allowed to proceed and the operating system 202 handles the requested action in its usual way. In this example, the agent 700 may determine that the requested uninstall should proceed based on the normal privilege settings as applied to the calling process 230 in the user account 210 by the operating system 202.

Figure 7:
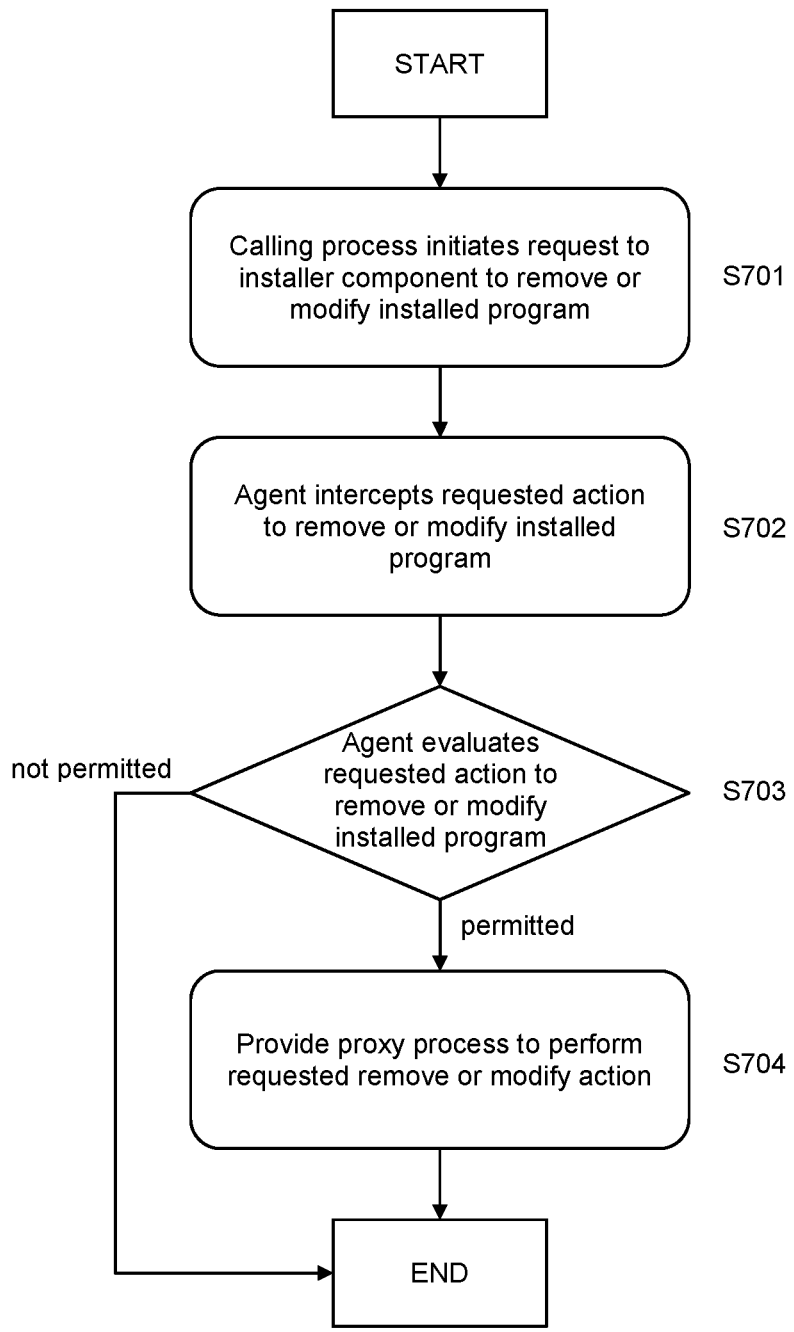
FIG. 7 is a flowchart showing an example method as applied to the example computer device.

FIG. 7 summarises an example method of removing or modifying an installed program on a computer device consistent with the present disclosure. In this example the method includes, at steps S701 and S702, intercepting, by an agent installed on the computer device, a requested action to remove or modify the installed program as initiated by a calling process associated with a current user account on the computer device and prior to reaching an installer component of an operating system of the computer device. At steps S703 & S704 the method includes, evaluating, by the agent on the computer device, the requested action to remove or modify, and where permitted by the agent, providing a proxy process as a proxy for the calling process and performing the requested action to remove or modify the installed program through the proxy process.

As will now be appreciated from the discussion herein, the example mechanism has many benefits and advantages. In particular, removal or modification of a program on a computer device is managed more securely and with enhanced functionality, without impacting the user experience. Program control typically determines whether or not to allow execution of an installed program, whereas the present mechanism relates to secure execution of re-installation, uninstallation, or updating of currently installed programs. These processes are often overlooked once the initial install has completed.

Typically, a high privilege level, such as an administrator, is needed in order to install an application and the same privilege level is also required in order to successfully modify or remove the application. For example, an administrator level user may need to provide elevated privilege via their own administrator account, or a user account of a specific user may need to be temporarily added to a privilege group having elevated privileges. For a pre-set time period, the user account has all the privileges and access permissions assigned to that group. After that time period, the user account is removed from the group and the privileges for the user reverted. These known methods of privilege elevation are cumbersome and heavy handed, giving an entire user account far higher privileges than is actually required for a particular program removal or modification task. By contrast, the present mechanism allows for specific privileges to be associated with each modification or removal action for specific programs. Thus greater control, with finer granularity, is provided over the modification or removal actions that may be initiated by a particular user account. Further, the described mechanism allows removal or modification actions for specific installed programs to be blocked, even when the logged-in user has (or is temporarily provided with) relevant privileges to perform that action. Therefore, security of the system is significantly improved.

The present mechanism has many benefits across a diverse population of users. Ordinary end users are now able to modify, e.g. update, programs in their usual way using standard operating system functionality, and may do so without unnecessary delay. IT administrators may enable users to update an application but not uninstall it, or allow a user to uninstall an application they no longer need, all without requiring full administrator privileges. Even product engineers, a class of user not often taken into consideration, are now able to restrict what actions can be achieved by an end user with high level privileges; for example restricting removal of a program which is intended for their product to run correctly.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A method of removing or modifying an installed program on a computer device, the method comprising:
   intercepting, by an agent installed on the computer device, a requested action to remove or modify the installed program as initiated by a calling process associated with a current user account on the computer device and prior to reaching an installer component of an operating system of the computer device; and
   evaluating, by the agent on the computer device, the requested action to remove or modify to determine whether to permit the requested action;
   in response to determining to permit the requested action, providing an elevated privilege process to perform the requested action for the calling process, wherein the elevated privilege process has privileges to perform the requested action and the calling process lacks privileges to perform the requested action; and
   performing the requested action to remove or modify the installed program in the elevated privilege process.

2. The method of claim 1, wherein intercepting the requested action to remove or modify the installed program comprises hooking a system call to the installer component.

3. The method of claim 2, wherein hooking the system call to the installer component comprises hooking a function of the operating system which returns configuration settings from a system registry relevant to the installed program.

4. The method of claim 1, wherein, in response to intercepting the requested action to remove or modify the installed program, information related to the current user account and the requested action to remove or modify are transferred to the agent.

5. The method of claim 1, wherein, in response to intercepting the requested action to remove or modify the installed program, information related to the current user interface state of the computer device is transferred to the agent to maintain the user interface state in the elevated privilege process.

6. The method of claim 1, wherein the agent provides the elevated privilege process with the privileges to perform the requested action to remove or modify the installed program using the installer component of the operating system.

7. The method of claim 1, wherein the installer component is a native installer component of the operating system having API functions.

8. The method of claim 7, wherein the call to the installer component is intercepted by placing a hook on the API functions.

9. The method of claim 5, wherein the information transferred to the agent includes a product code global unique identifier (GUID) of the installed program.

10. The method of claim 1, further comprising launching, by the agent, the elevated privilege process as a new process.

11. The method of claim 1, wherein evaluating the requested action to remove or modify by the agent on the computer device comprises checking, by the agent, a received command line string against configuration settings in a system registry to determine a registry entry which identifies localities of a diverse set of resources for the installed program.

12. The method of claim 11, wherein the received command line string is extracted and provided to the agent in response to intercepting the requested action.

13. The method of claim 12, wherein the calling process calls a shell execution function to execute the third party installer and intercepting the requested action comprises intercepting the shell execute function.

14. The method of claim 11, wherein the checking comprises comparing the received command line string against uninstall key values of installed program entries in the system registry to identify the installed program which is to be removed or modified by the requested action.

15. The method of claim 1, wherein the agent determines a passive mode in which to perform the requested action to remove or modify the installed program by passing the requested action to the installer component under the privileges of the calling process in the current user account.

16. The method of any of claim 1, further comprising selectively determining by the agent that the requested action to remove or modify the installed program should be blocked.

17. The method of claim 16, wherein the calling process in the current user account itself has privileges sufficient to perform the requested action to remove or modify and wherein the agent as a gatekeeper selectively blocks the requested action.

18. The method of claim 1 wherein the calling process initiates the requested action to remove or modify responsive to receiving a user interaction through a control panel interface component of the operating system including at least one of an add or remove programs ('ARP') interface component and an applications and features interface ('AFI') component.

19. A computer device comprising:
a memory; and
processing circuitry configured to:
perform operations to manage removal or modification of an installed program on the computer device, the operations comprising:
intercepting, by an agent installed on the computer device, a requested action to remove or modify the installed program as initiated by a calling process associated with a current user account on the computer device and prior to reaching an installer component of an operating system of the computer device; and
evaluating, by the agent on the computer device, the requested action to remove or modify;
in response to determining to permit the requested action, providing an elevated privilege process to perform the requested action for the calling process, wherein the elevated privilege process has privileges to perform the requested action and the calling process lacks privileges to perform the requested action; and
performing the requested action to move or modify the installed program in the elevated privilege process.

20. A tangible non-transitory computer-readable storage medium having recorded thereon instructions which, when executed by processing circuitry of a computer device, configures the computer device to perform operations to manage removal or modification of an installed program on the computer device, the operations comprising:
intercepting, by an agent installed on the computer device, a requested action to remove or modify the installed program as initiated by a calling process associated with a current user account on the computer device and prior to reaching an installer component of an operating system of the computer device; and
evaluating, by the agent on the computer device, the requested action to remove or modify to determine whether to permit the requested action;
in response to determining to permit the requested action, providing an elevated privilege process to perform the requested action for the calling process, wherein the elevated privilege process has privileges to perform the requested action and the calling process lacks privileges to perform the requested action; and
performing the requested action to remove or modify the installed program in the elevated privilege process.

* * * * *